US011686928B2

(12) United States Patent
Fahrbach (10) Patent No.: US 11,686,928 B2
(45) Date of Patent: Jun. 27, 2023

(54) LIGHT MICROSCOPE (71) Applicant: Leica Microsystems CMS GmbH, Wetzlar (DE)

(72) Inventor: Florian Fahrbach, Mannheim (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 505 days.

(21) Appl. No.: 16/332,851

(22) PCT Filed: Sep. 18, 2017

(86) PCT No.: PCT/EP2017/073455
§ 371 (c)(1),
(2) Date: Mar. 13, 2019

(87) PCT Pub. No.: WO2018/050888
PCT Pub. Date: Mar. 22, 2018

(65) Prior Publication Data
US 2019/0361213 A1 Nov. 28, 2019

(30) Foreign Application Priority Data

Sep. 16, 2016 (DE) .................. 10 2016 117 522.6

(51) Int. Cl.
*G02B 21/00* (2006.01)
(52) U.S. Cl.
CPC ..... *G02B 21/0032* (2013.01); *G02B 21/0048* (2013.01); *G02B 21/0064* (2013.01); *G02B 21/0076* (2013.01)
(58) Field of Classification Search
CPC .. G02B 21/00; G02B 21/002; G02B 21/0032; G02B 21/0048; G02B 21/0064;
(Continued)

(56) References Cited

U.S. PATENT DOCUMENTS 7,339,148 B2 * 3/2008 Kawano ............... G02B 21/002
250/201.3
8,582,203 B2 11/2013 Dunsby
(Continued)

FOREIGN PATENT DOCUMENTS

DE 103 37 345 * 8/2003
DE 10337296 A1 3/2005
(Continued)

OTHER PUBLICATIONS

Borlinghaus, "Spectral Imaging: How to Separate the Colors," (Dec. 9, 2011), XP055429239.
(Continued)

*Primary Examiner* — Thong Q Nguyen
(74) *Attorney, Agent, or Firm* — Leydig, Voit & Mayer, Ltd.

(57) ABSTRACT

A light microscope includes a scan illumination unit, which is designed to illuminate a specimen having a line focus produced by an illumination light beam and moved transversely to a light propagation direction. A descanned detection unit is designed to produce a stationary first line image of a target region from detection light that originates from a target region of the specimen illuminated with the moving line focus. The scan illumination unit and the descanned detection unit have a common objective, which is designed to receive both the illumination light beam and the detection light. The descanned detection unit contains a dispersive element, which is designed to spectrally split the detection light in order to generate multiple second line images, corresponding to the first line image, with different spectral compositions.

20 Claims, 10 Drawing Sheets (58) Field of Classification Search
CPC .. G02B 21/0076; G02B 21/06; G02B 21/361;
G02B 5/00; G02B 5/04; G02B 5/18;
G02B 5/1804; G02B 5/1814; G02B
5/1828; G02B 5/1842; G02B 27/10;
G02B 27/1006; G02B 27/1013; G02B
27/102; G02B 27/1026; G02B 27/1046;
G02B 27/106
USPC .......... 359/615, 368–398, 618–640
See application file for complete search history.

(56) References Cited

U.S. PATENT DOCUMENTS

| | | | |
|---|---|---|---|
| 8,773,757 B2* | 7/2014 | Chen | G02B 21/0064 359/368 |
| 9,030,734 B2 | 5/2015 | Knebel et al. | |
| 2003/0071227 A1 | 4/2003 | Wolleschensky | |
| 2003/0179372 A1* | 9/2003 | Knebel | G02B 21/0064 356/318 |
| 2005/0179892 A1* | 8/2005 | Gerstner | G02B 21/0064 356/318 |
| 2006/0152787 A1 | 7/2006 | Knebel et al. | |
| 2007/0063153 A1* | 3/2007 | Widzgowski | G02B 21/008 250/461.2 |
| 2007/0241266 A1* | 10/2007 | Gweon | G02B 21/0064 250/225 |
| 2012/0140240 A1 | 6/2012 | Hillman et al. | |

FOREIGN PATENT DOCUMENTS

| | | |
|---|---|---|
| DE | 102006011277 A1 | 9/2007 |
| DE | 102011000835 A1 | 8/2012 |
| EP | 2775472 A2 | 9/2014 |
| JP | 2003185582 A | 7/2003 |
| JP | 2006510926 A | 3/2006 |
| JP | 2009244156 A | 10/2009 |
| JP | 2012003196 A | 1/2012 |
| WO | WO 2013/009414 A2 | 1/2013 |
| WO | WO 2015109323 A2 | 7/2015 |
| WO | WO 2017015077 A1 | 1/2017 |

OTHER PUBLICATIONS

Bouchard, et al., "Swept Confocally-Aligned Planar Excitation (SCAPE) Microscopy for High-Speed Volumetric Imaging of Behaving Organisms," *Nature Phototonics*, 9: 1-22 (Jan. 19, 2015).

Dunsby, et al., "Optically Sectioned Imaging by Oblique Plane Microscopy," *Optics Eypress*, 16 (25): N/A (Nov. 24, 2008).

Tokunaga, et al., "Highly Inclined Thin Illumincation Enables Clear Single-Molecule Imaging in Cells," Nature Methods, 5 (2): 159-161 (Feb. 2008).

Jahr, et al., "Hyperspectral Light Sheet Microscopy," *Nature Communications*, 6: 1-7 (Sep. 2, 2015).

Unknown, "Multichannel System Filter Section," (Jan. 1, 2010), XP055427831.

Kumar, et al., "High-Speed 2D and 3D Fluorescence Microscopy of Cardiac Myocytes," *Optics Express*, 19 (15): N/A, (Jul. 6, 2011).

* cited by examiner

LIGHT MICROSCOPE

CROSS-REFERENCE TO PRIOR APPLICATIONS

This application is a U.S. National Stage Application under 35 U.S.C. § 371 of International Application No. PCT/EP2017/073455 filed on Sep. 18, 2017, and claims benefit to German Patent Application No. DE 10 2016 117 522.6 filed on Sep. 16, 2016. The International Application was published in German on Mar. 22, 2018 as WO 2018/050888 A1 under PCT Article 21(2).

FIELD

The invention relates to a light microscope comprising a scan illumination unit embodied to illuminate a specimen with a line focus that is produced by an illumination light beam and that is moved transversely to the light propagation direction, and a descanned detection unit that is designed to produce a stationary first line image of the target region from detection light which originates from a target region of the specimen illuminated with the moving line focus, wherein the scan illumination unit and the descanned detection unit have a common objective which is embodied to receive both the illumination light beam and the detection light.

BACKGROUND

In particular in fluorescence microscopy, microscopy methods in which the sample is illuminated with a flat or linearly extended light distribution have been used recently. Examples of these are microscopy methods known under the designations SPIM (Single Plane Illumination Microscopy) OPM (Oblique Plane Microscopy) and SCAPE (Swept Confocally Aligned Planar Excitation). Thus, in a SPIM microscope, for example, an illumination light beam is focused in only a first direction using a cylindrical lens, for example, and is extended perpendicular to this first direction, whereby the specimen is illuminated with a light sheet or a light disk that illuminates only one specimen plane within the specimen. For illumination and detection, a SPIM microscope has two separate objectives on the sample side, whose optical axes are perpendicular to each other. The sample plane to be imaged is perpendicular to the optical axis of the detection objective. This sample plane is illuminated by the light sheet which irradiates the illumination objective into the sample perpendicular to the optical axis of the detection objective.

In contrast, in the SCAPE method, a single sample-side objective is used for both illumination and detection. The illumination is performed with a light sheet lying obliquely to the optical axis of the objective. As a result of this inclination of the light sheet, a SCAPE microscope typically has an upright optical system interacting with the lens with optical subsystems that are obliquely positioned relative to one another and which, via an intermediate image, ensure that the sample region illuminated with the oblique light sheet is displayed on the detector in the correct position.

For a more detailed explanation of the aforementioned SPIM, OPM and SCAPE method, exemplary reference is made to the publications by Kumar, S. et al, High-speed 2D and 3D fluorescence microscopy of cardiac myocytes. Opt. Express 19, 13839 (2011); Dunsby, C., Optically sectioned imaging by oblique plane microscopy, Opt. Express 16, 20306-20316 (2008) and Bouchard, M. B. et al., Swept confocally-aligned planar excitation (SCAPE) microscopy for high speed volumetric imaging of behaving organisms, Nat. Photonics 9, 113-119 (2015) as well as patent documents U.S. Pat. No. 8,582,203 B2 and U.S. Pat. No. 8,619,237 B2.

A related microscopy method which, however, does not require any device optics, is the so-called HILO method (Highly Inclined And Laminated Optical Sheet). Reference is made to Tokunaga, M., Imamoto, N. & Sakata-Sogawa, K., Highly inclined thin illumination enables clear single molecule imaging in cells, Nat. Methods 5, 159-161 (2008).

In DE 10 2011 000 835 B4, the light sheet provided for oblique illumination of the sample is produced by means of a scanning unit which is located in a plane conjugate to the rear focal plane of the illumination objective. The fluorescent light to be detected is coupled out between the objective and the scanning unit.

The prior art is further referred to WO 2015/109323 A2, which inter alia shows a microscope assembly in which a dichroic mirror for separating the fluorescence light to be detected is arranged downstream of a scanning mirror in the light direction, so that the fluorescent light is directly scanned by the scanning mirror. This structure corresponds largely to the structure of a point-scanning confocal microscope. However, it differs therefrom in that the illumination beam is weakly focused and directed obliquely into the sample. On the other hand, the fluorescent light collected from the oblique line focus running against the focal plane of the objective lens is erected with an upright optical system. As a result, image information along the illuminated line can be obtained using a line sensor. Since the scanning mirror is used both for scanning the sample with the illumination beam and for descanning the detected fluorescent light, a stationary detector can be used.

The simultaneous capture of images in various wavelength ranges represents a special challenge in light sheet fluorescence microscopy. For a light sheet microscope which provides separate objectives for illumination and detection, a solution has been proposed for this in Jahr et al., Hyperspectral light sheet microscopy; Nat. Commun. 6, 7990 (2015). However, in addition to a first scanning mirror in the illumination beam path, that is used for scanning the illumination beam through the specimen, a further scanning mirror is necessary here in the structurally separated detection beam path, which is necessary for descanning the fluorescent light originating from the illuminated region, so that the fluorescent light can be imaged onto a stationary line and ultimately spectrally split. The two separate scanning mirrors must be synchronized, which is technically complex and susceptible to interference.

Also for OPM and SCAPE applications in which a single objective facing the specimen is provided for illumination and detection, there are solutions for simultaneous image capture in different wavelength ranges. In WO 2015/109323 A2 and in the aforementioned publication by Dunsby for imaging multiple dyes, it is proposed to split the detection light originating from the sample by means of dichroic beam splitters and to direct it onto different detectors. However, this is actually only practical with two colors and fixed wavelength ranges. On the one hand, the flexibility is limited, because, for a change in the wavelength ranges, the dichroic beam splitters and any existing filters must be exchanged. In particular, exchanging a dichroic beam splitter is problematic, because its alignment affects the position of the image on the detector. The number of simultaneously detectable wavelength ranges is limited here by the number of dichroic beam splitters or the number of detectors.

Moreover, it should be noted that the minimum bandwidth of conventionally used dichroites and filters is currently around 20 nm, far longer than the width of the emission spectra of typical diodes and solid-state lasers. In particular the width of the filter may already be too large for specific applications. If, for example, an image is captured using two fluorophores, it is a problem if the excitation light source for one of the fluorophores is within the emission region of the other fluorophore. In this case, at an assumed bandwidth of 20 nm, a wavelength range of 20 nm is excised from the detection light by separation of the fluorescent light via a dichroic filter or by blocking the excitation light via a blocking filter, whereby the measurable signal is significantly reduced. This problem also arises for detection by means of an area detector as described in the aforementioned publication by Jahr et al. The excitation light in the detection beam path must be blocked there as well so that it does not hit the detector. This requires the use of multiband barrier filters with production-related minimum width that also block wide ranges of the emission spectrum.

In the solution proposed in the prior art, the spectral resolution is therefore severely limited by the minimum bandwidth of the dichroites or bandpass filters. Moreover, a mechanical change of said optical components, which is time consuming and requires a large number of components, is required for adjusting the detected spectral range. If the emission spectra of different dyes contained in the specimen overlap, a spectral demixing is required in order to separate and correctly assign the contributions of the different dyes to the measured signal. A development corresponding to this demixing is difficult.

SUMMARY

In an embodiment, the present invention provides a light microscope. The light microscope includes a scan illumination unit, which is designed to illuminate a specimen having a line focus produced by an illumination light beam and moved transversely to a light propagation direction. A descanned detection unit is designed to produce a stationary first line image of a target region from detection light that originates from a target region of the specimen illuminated with the moving line focus. The scan illumination unit and the descanned detection unit have a common objective, which is designed to receive both the illumination light beam and the detection light. The descanned detection unit contains a dispersive element, which is designed to spectrally split the detection light in order to generate multiple second line images, corresponding to the first line image, with different spectral compositions.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the invention provide a light microscope and a method that make it possible to simultaneously capture multiple specimen images in different, preferably flexibly adjustable, wavelength ranges during light-microscopic imaging in which a common objective is used for the illumination and detection with relatively minimal technical effort.

The light microscope according to an embodiment of the invention comprises a scan illumination unit which is designed to illuminate a specimen with a line focus produced by an illumination light beam and moved transversely to the light propagation direction, and a descanned detection unit which is designed to produce a stationary first line image of the target region from detection light originating from a target region of the specimen illuminated with the moving line focus, wherein the scan illumination unit and the descanned detection unit have a common objective which is designed to receive both the illumination light beam and the detection light. The descanned detection unit includes a dispersive element configured to spectrally split the detection light to produce multiple second line images of different spectral composition corresponding to the first line image.

The light microscope is particularly useful in applications in which a single objective facing the specimen is used for illumination and detection, as is the case, for example, in an SCAPE application. The invention enables a hyperspectral image capture there, i.e. simultaneous capturing of a plurality of images in closely adjacent color channels, i.e. wavelength ranges. These wavelength ranges can extend beyond the visible spectrum up into the infrared and/or ultraviolet range.

The line focus according to the invention is to be understood as meaning a linear illumination light distribution which defines the target region in the specimen directly exposed to the illumination light. Accordingly, in the present case the image that the detection unit produces from the target region illuminated with the line focus is referred to as a line image. It goes without saying that the term "line" here is not to be understood in a mathematical sense as a one-dimensional object which is characterized solely by its longitudinal extent, i.e. does not have any extension perpendicular to its longitudinal extent. Rather, the term "line" is intended to indicate that the illumination light distribution in question—and accordingly the resulting image—is oblong or elongated in a sense that its extent in the longitudinal direction clearly exceeds that in the transverse direction. The line focus and the corresponding line image can thus be understood as strip-shaped, in particular in delimitation of a punctiform or planar image.

The scan illumination unit according to an embodiment of the invention is designed such that it moves the line focus transversely, preferably perpendicularly to the light propagation direction and, thus, can scan the specimen with the line focus. The detection unit is accordingly formed as a so-called descanned unit, i.e. as a unit that is capable of descanning or unscanning the detection light resulting from the illumination with the scanning line focus. This means, that the descanned detection unit acts on the detection light such that the scanning motion imparted to the illumination light beam by the scan illumination unit is raised with respect to the detection light in the sense of a counteraction, which has the consequence that the target region illuminated with the scanning line focus can be imaged in the form of a stationary line image.

For this purpose, the scan illumination unit and the descanned detection unit preferably have a common light deflection element which can be rotated about at least one axis, preferably about two axes lying perpendicular to one another, for scanning the illumination light beam and for descanning the detection light. In the latter embodiment, the deflection element is a 2D scanning mirror, for example a galvanometer mirror or a micromechanical mirror (MEMS), that is arranged in a plane conjugated to the rear focal plane of the objective. By rotating the deflection element about a first of the two aforesaid axes, the illumination light beam reflected at the deflection element, and with it the line focus, perform a scanning movement, which as a result leads to the generation of a light sheet in the specimen. The light sheet produced by the scanning line focus can then likewise be pushed through the specimen as a whole by tilting the light deflection element about the other of the two aforementioned axes. Scanning the specimen with the illumination light beam and the descanning of the detection light emitted from the specimen take place in the above-described embodiment as in a conventional confocal microscope, with the difference that, in the latter case, the specimen is illuminated point by point and detected while the present invention provides a line-by-line illumination and detection.

The imaging according to an embodiment of the invention of the target region illuminated with the moving line focus in the form of a stationary line image makes it possible to use the direction perpendicular to this line image as a degree of freedom for the spectral splitting of the detection light. For this purpose, the descanned detection unit according to the invention has a dispersive element that splits the detection light into different spectral components, which are then used to produce second line images which, apart from the spectral information contained therein, correspond to the first line image. In this way the target region just considered can simultaneously be captured in multiple color channels.

The dispersive element is, for example, a prism or a diffraction grating that is arranged in the beam path of the detection light. However, the invention is not limited to such a design. Thus, it is also possible, for instance, to form the dispersive element as a spatial light modulator (SLM for short) on the basis of liquid crystals on silicon (LCoS), which, on the one hand, are birefringent and, on the other hand, exhibit strong dispersion. Such a light modulator can delay the phase of polarized detection light in a location-dependent manner by point-by-point control of the orientation of the liquid crystals. It is thereby possible to simulate diffraction gratings with different grating periods or prisms with different angles between their two refractive edges in order to realize different dispersions. In this way, the spectral resolution can be adapted to the respective requirements to be observed, such as acquisition speed and sensitivity.

Preferably, the splitting direction of the dispersive element is perpendicular to the longitudinal extent of the first line image. Said splitting direction designates that direction along which the dispersive element spatially fans out the detection light.

The descanned detection unit preferably contains an optical element, for example a lens, which is designed to direct the light of the first line image onto the dispersive element. This optical element preferably provides collimation of the light since the dispersive element is preferably located in a plane in which light is collimated. Furthermore, the dispersive element is preferably illuminated over a large surface, meaning that a spectral resolution of the light can occur that is sufficient for the desired application.

In a preferred embodiment, the descanned detection unit has a slit diaphragm arranged at the location of the first line image, wherein said slit diaphragm is preferably oriented parallel to the longitudinal extent of the first line image. The width of the slit diaphragm and the strength of the wavelength-dependent splitting of the dispersive element together determine the effective spectral resolution.

In a special embodiment, the descanned detection unit contains at least one sensor configured as an area detector for detecting the second line images and on which the second line images are produced parallel to one another. If a spatial light modulator is used as the dispersive element, as explained above, or if the dispersive element is exchangeable, for example by arrangement of multiple dispersive elements in an apparatus for exchanging these elements, such as a slider, then the spectral splitting of the detection light can be flexibly adapted to the dimensions of the area detector. This can be used, for example, to achieve the maximum possible spectral resolution if necessary. However, such an adjustment is also possible in the manner that an unduly large fanning out of the detection light on the area detector is avoided, for example, in order to increase the read-out speed via a smaller detector region to be read out or to increase the strength of the signal to be detected by the area detector so as to improve the signal-to-noise ratio of the signal detected by the area detector.

In an alternative embodiment, the descanned detection unit contains multiple sensors, each designed as a line detector, for detecting the second line images and on each of which one of the second line images is produced. In this case, a dedicated line detector is assigned to each second line image. The spatial arrangement of the line detectors here corresponds to the spectral splitting of the detection light which is effected by the dispersive element.

However, the invention is not limited to using either exclusively area detectors or exclusively line detectors to detect the line images spatially separated from one another by the dispersive element. A combination of area and line detectors is also conceivable.

In a particularly preferred embodiment, the descanned detection unit contains at least one anamorphic optical system (such as a cylindrical lens) arranged upstream of one of the sensors and its optical effect in the splitting direction of the dispersive element is adapted to the extension of the sensor in the splitting direction. Such an anamorphic optical system is advantageous in particular in combination with a sensor formed as a line detector. In this case the anamorphic optical system is designed such that, for example, its magnification in the direction of the longitudinal extent of the line detector is equal to 1 so that it has a neutral effect in this direction while it has a reducing effect in splitting direction. This compresses onto the line detector the spectral information contained in the selected spectral band and associated with the line detector. In other words, it is therefore possible, using such an anamorphic optical system, to image line images of different colors or wavelengths onto a common sensor, such as a line detector, and to optimize the dimensions of the image for the dimensions of such a sensor: The dispersive element spectrally splits the detection light and in so doing produces a plurality of line images from a multispectral (colored) line image, wherein the position of the line images perpendicular to the longitudinal direction of the line images depends on the color/wavelength of the respective line image. Using the anamorphic optical system, a part of this set of line images can be imaged onto a line sensor, wherein the spectral splitting is compressed along the axis of the spectral splitting while a one-to-one imaging takes place along the image axis, as already described above.

In a particular embodiment, the line detectors are arranged in a plane parallel to one another. With a corresponding deflection of the spectral components of the detection light fanned out by the dispersive element, it is nevertheless possible to distribute the line detectors in any desired manner in space in order to obtain a desired detector arrangement.

Preferably, at least one of said sensors is displaceable in a direction that corresponds to the splitting direction of the dispersive element.

In this way, the spectral component of the detection light, which is to be detected by the respective sensor, can be adjusted in a particularly simple manner via its position.

In a particularly preferred embodiment, the descanned detection unit contains at least one light deflecting element that deflects a portion of the detection light split by the dispersive element onto one of the sensors. This light deflecting element is preferably displaceable in a direction that corresponds to the splitting direction of the dispersive element.

Preferably, multiple light deflection elements are provided, which deflect the split detection light successively from one side or alternately from two opposite sides respectively onto one of the sensors. In these embodiments, the detection light, fanned out by the dispersive element from one edge, or alternately from the two edges of the detection light, fanned out by the dispersive element, are coupled out into separate beam paths and are supplied there to the respective sensors.

The descanning detection unit preferably contains at least one light blocking element, which blocks spectral components of the detection light that are within the wavelength range of the illumination light beam. This light blocking element has the function—in particular in a fluorescence microscopic application in which the illumination light beam represents the excitation light and the detection light represents the fluorescence radiation triggered by the excitation light—of separating the excitation light reflected at the specimen from the fluorescence radiation to be detected. In this way, the reflected excitation light generally has a significantly higher intensity than the fluorescence radiation to be measured. In order to prevent the excitation light from hitting the detector or the detectors, the light blocking element filters the excitation light out of the detection light. The light blocking element is designed, for example, as a bandpass filter, which is arranged upstream of the dispersive element in the detection beam path.

In a particularly preferred embodiment, the light blocking element can also be arranged downstream of the dispersive element and thereby be arranged in a region of the detection beam path in which the detection light is already fanned out into its different spectral components by the dispersive element. The light blocking element in this case is preferably displaceable in the splitting direction of the dispersive element. In this way, the wavelength range that is to be filtered out of the detection light by the light blocking element can be flexibly adjusted in a particularly simple manner.

The light blocking element is made of a thin, transparent substrate having one or more non-transparent regions that absorb or reflect the incident detection light. The reflection takes place ideally not back in the beam path of the detection light, but in the direction of a light trap.

In a particularly preferred embodiment, an arrangement is provided that comprises multiple light blocking elements of the aforementioned type arranged one behind the other in the spectrally fanned-out detection light. Each of these light blocking elements in turn has one or more light-absorbing or reflecting regions on the transparent substrate. By virtue of the substrates being offset from each other in the splitting direction of the dispersive element, a plurality of wavelength ranges can be set that are filtered out of the detection light. The number of the light blocking elements that are displaceable with respect to each other is freely selectable. A dedicated light blocking element is typically provided for each excitation wavelength range.

Another possible design includes at least one light blocking element and/or light deflecting element that includes an arrangement of mirror elements or reflectors (in particular micromirror actuators such as, for example, DMDs (Digital Mirror Devices) or else LCoS modulators) switchable in sections perpendicular to the splitting direction of the dispersive element. They have at least two positions, wherein the incident detection light preferably is reflected in the direction of at least one detector in at least one position. In the at least one other position, the incident detection light is reflected by the mirror elements or reflectors in a different direction (for example in the direction of a beam trap or another detector), blocked or, alternatively, also transmitted. Thus, detection light of a selectable wavelength range can specifically be detected by such an arrangement. Alternatively or additionally, a variant of this embodiment is also conceivable, of course, in which detection light transmitted through the arrangement is directed onto a detector. Such a variant need not necessarily include the possibility of detecting the detection light reflected by the arrangement.

Figure 1:
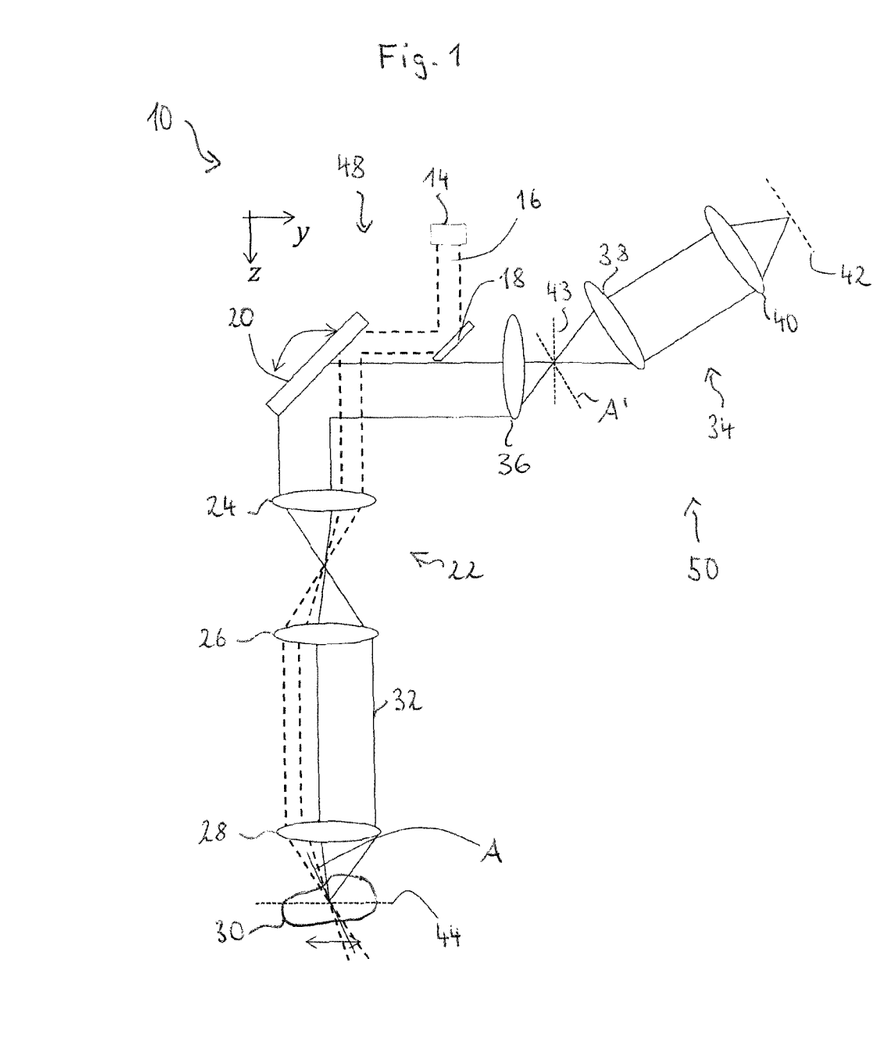
FIG. 1 shows a SCAPE microscope in a y-z section.
Figure 2:
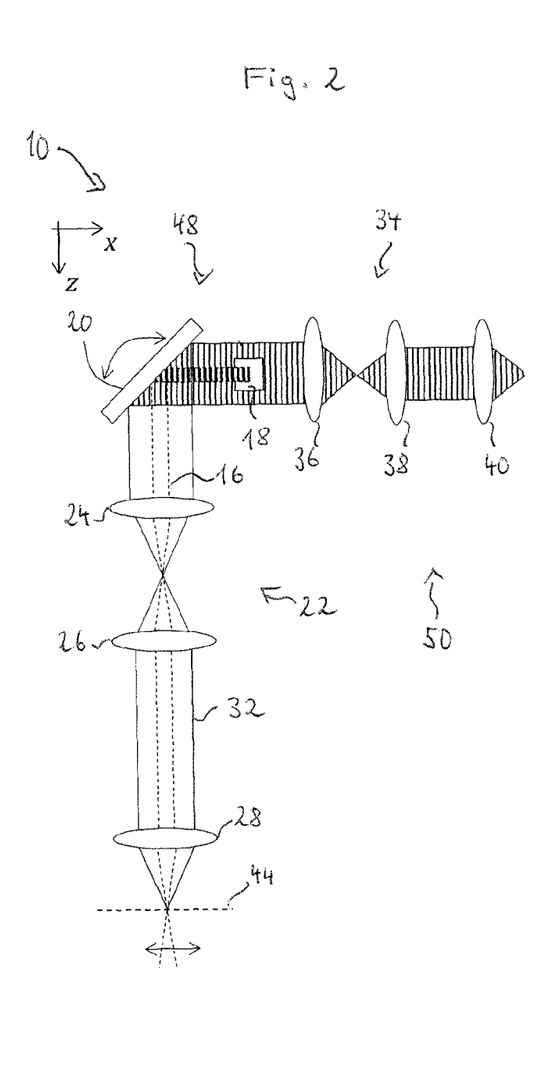
FIG. 2 shows the SCAPE microscope according to FIG. 1 in an x-z section.

The structure of a SCAPE microscope 10 to which reference is also made for the explanation of the exemplary embodiments according to the invention is first explained in reference to FIGS. 1 and 2. In FIGS. 1 and 2 as well as all other figures, reference is made to an orthogonal coordinate system with the axes x, y and z.

As shown in FIGS. 1 and 2, the SCAPE microscope 10 includes a light source 14 which emits an illumination light beam 16. The illumination light beam 16 hits a mirror 18, which reflects the illumination light beam 16 in the direction of a 2D scanning mirror 20. The scanning mirror 20, designed, for example, as a galvanometer mirror or MEMS mirror, can be tilted both about the x-axis (in FIG. 1 perpendicular to the drawing plane) and about the y-axis (in FIG. 2 perpendicular to the drawing plane) by means of a drive. The illumination light beam 16 reflected at the scanning mirror 20 enters an optical system 22, which is formed by a scanning lens 24, a tube lens 26, and an objective 28. The scanning mirror 20 is located in a plane conjugated to the rear focal plane of the objective 28. The scanning mirror 20 and the optical system 22 form a telecentric system.

As shown in FIG. 1, the illumination light beam 16 hits the scanning mirror 20 such that it is radiated as a collimated beam into the objective 28 in an offset manner along the y-axis. Accordingly, the illumination light beam 16 illuminates only an off-center partial region of the entrance pupil of the objective 28, whereby it propagates tilted within a specimen 30 with respect to the optical axis of the objective 28. The objective 28 focuses the illumination light beam 16 only weakly, so that an elongated and inclined illumination light distribution is formed in the specimen 30 that is hereinafter referred to as line focus. The line focus illuminates the specimen 30 in a line- or strip-shaped target region A, which is shown only purely schematically in FIG. 1, and excites the specimen 30 there for the emission of fluorescence radiation. For ease of illustration, specimen 30 is shown only in FIG. 1.

Tilting the scanning mirror 20 about the y-axis leads to a parallel offset of the line focus longitudinally in the direction of the x-axis in the specimen 30, so that the line focus scans the specimen in this direction. This scanning movement of the line focus transversely to the light propagation direction, i.e. transversely to the illumination axis, is likewise used to form a light sheet. By tilting the scanning mirror 20 about the x-axis, this light sheet can be moved through the specimen 30 in the direction of the y-axis.

The fluorescence radiation triggered by the line focus in the specimen 30, hereinafter referred to as detection light 32, in turn enters the objective 28, which accordingly functions both as an illumination objective and as a detection objective. After passing through the tube lens 26 and the scan lens 24, the detection light 32 hits the scanning mirror 20, which reflects the detection light 32 such that it goes past the deflection mirror 18 and enters an upright optical system 34. The upright optical system 34 comprises a second objective 36, a third objective 38, and a tube lens 40. By returning to the scanning mirror 20, the detection light 32 is descanned similarly to the case of a confocal microscope. In this way, the illuminated target region A is imaged via intermediate imaging in the upright optical system 34 into a stationary, line-like intermediate image A'. The intermediate image A' is inclined relative to a plane 43, which is optically conjugated to the focal plane of the optical system 22, which is designated as 44 in FIGS. 1 and 2. For better clarity, only the detection beam path for a single point along the target region A was drawn in as an example. However, all points along the target region A are obviously imaged next to one another in the line image 42.

As shown in FIG. 1, the upright optical system 34 comprises a first optical subsystem in the form of the objective 36 and a second optical subsystem positioned obliquely thereto and formed from the objective 38 and the tube lens 40. These two diagonally oriented optical subsystems 36 and 38, 40, respectively, cause the intermediate image A' to be converted into a line image 42 in the correct position.

In a conventional SCAPE microscope, the line image 42 thus produced would be imaged directly onto a line detector. In contrast, the invention provides for the line image 42 to be split into multiple line images of different spectral composition by spectral splitting of the detection light 32 in a hyperspectral detector module, which is shown in FIGS. 1 and 2. The aforementioned detector module is further described in detail below.

As mentioned above, the objective 28 receives both, the illumination light beam 16 emitted from the light source 14 and the detection light 32 originating from the specimen 30. Thus, the objective 28 is both a part of an illumination unit, generally designated 48 in FIGS. 1 and 2 and comprising the components 14, 18, 20 and 22 in addition to the objective 28, and a part of a detection unit, generally designated as 50 in FIGS. 1 and 2 and comprising the components 22, 20, 36 and 34 in addition to the objective 28. Thus, the 2D scanning mirror 20 is also both a part of the illumination unit 48 and a part of the detection unit 50. As explained above, the 2D scan mirror 20, on the one hand, has the function of scanning the specimen 30 with the line focus A and, on the other hand, the function of descanning the detection light 32 originating from the specimen 30 in order to convert the moving line focus A into the stationary line image 42. Accordingly, the illumination unit 48 can be understood as a scan unit and the detection unit 50 as a descanned unit.

At this point, it should be pointed out that the representation of the detection beam path in FIG. 2 is greatly simplified. In fact, the part of the detection beam path lying between the scanning mirror 20 and the objective 36 runs perpendicular to the drawing plane of FIG. 2, while the part of the detection beam path adjoining in the direction of the line image 42 extends obliquely from the drawing plane in FIG. 2.

Figure 3:
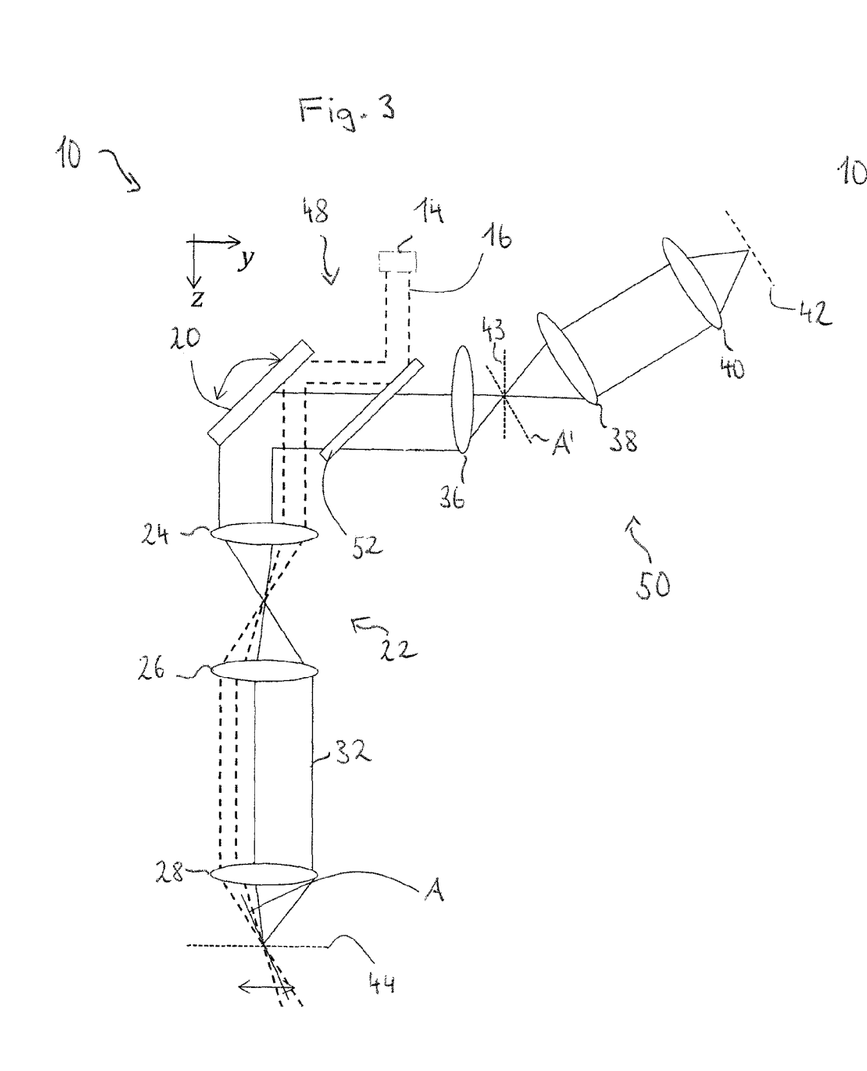
FIG. 3 shows a modification of the SCAPE microscope with a y-z section.
Figure 4:
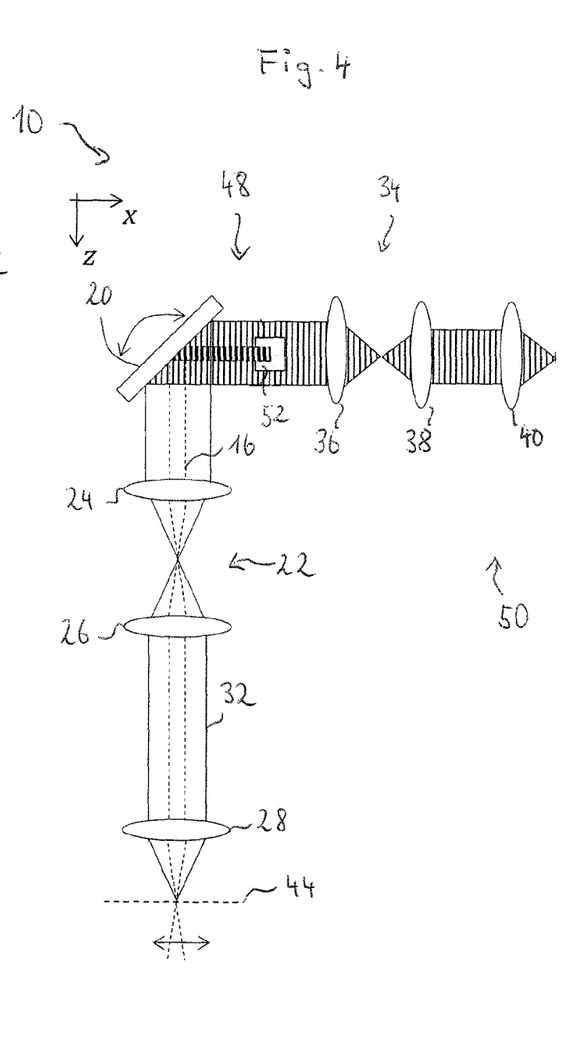
FIG. 4 shows the fourth embodiment of the microscope in an x-z-section.

In FIGS. 3 and 4, a modified embodiment is shown in a y-z section or an x-z section and differs from the embodiment according to FIGS. 1 and 2 only in that a dichroic beam splitter 52 is provided instead of the mirror 18. It is arranged both in the beam path of the illumination light beam 16 and in the beam path of the detection light 32. The dichroic beam splitter 52 is configured to reflect the illumination light beam 16 and transmit the detection light 32. The dichroic beam splitter 72 is thus part of the illumination unit 48 as well as part of the detection unit 50.

Figure 5:
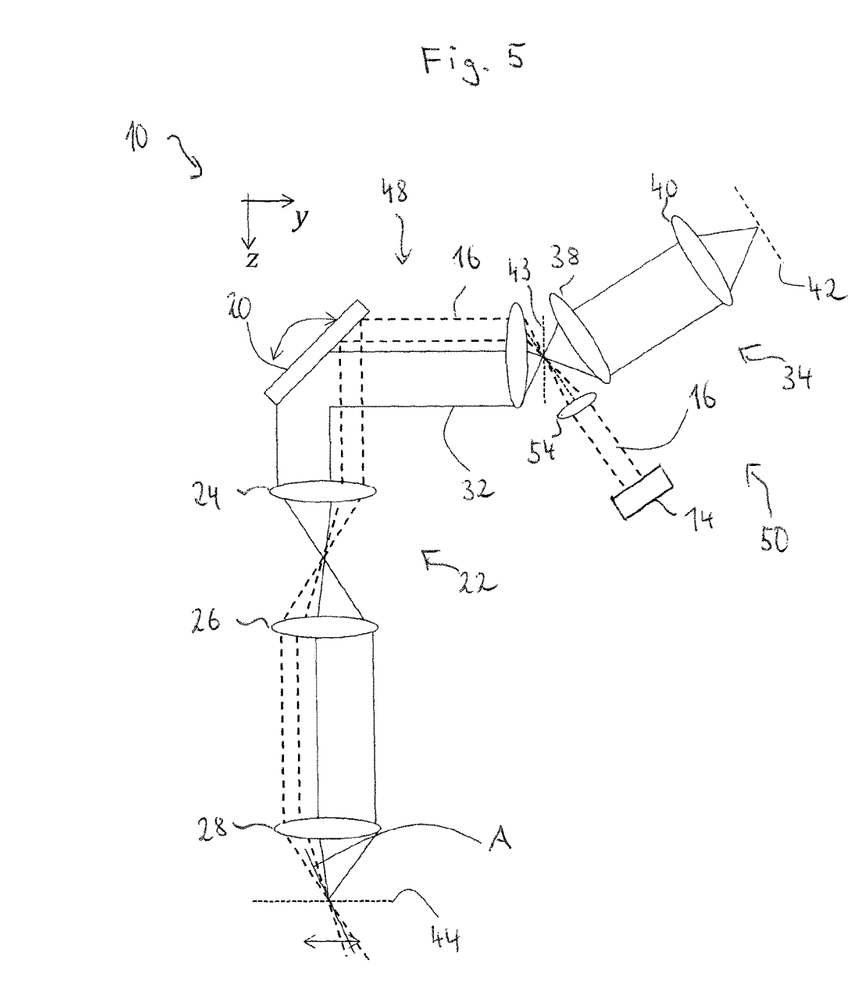
FIG. 5 shows a further modification of the SCAPE microscope in a y-z section.
Figure 6:
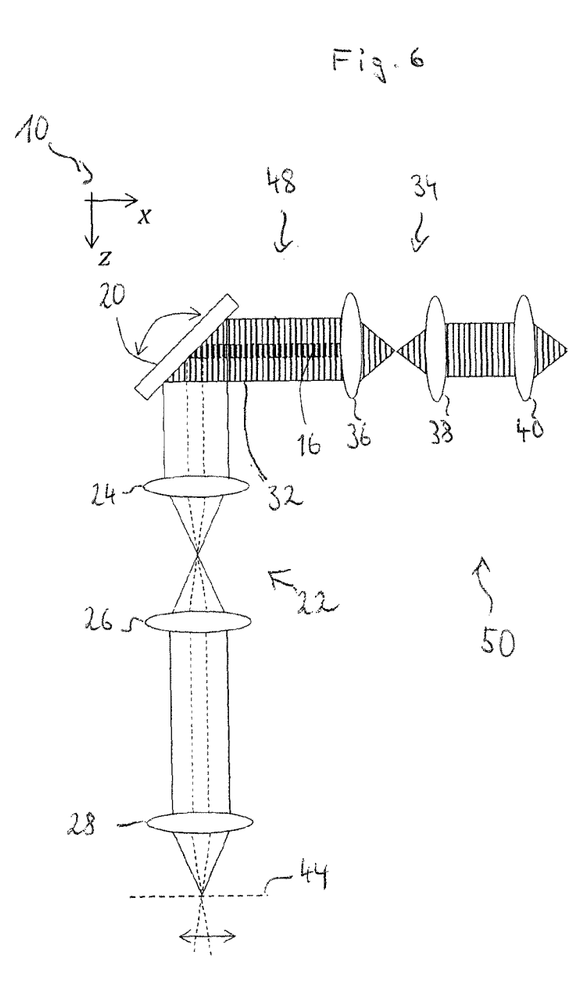
FIG. 6 shows the further modification of the SCAPE microscope in an x-z section.

FIGS. 5 and 6 show a further modification of the SCAPE microscope 10 in a y-z section and an x-z section, respectively. In this embodiment, the illumination light beam 16 emitted by the light source 14 is coupled into the illumination beam path via the objective 36 contained in the upright optical system 34. For this purpose, the light source 14 is arranged upstream of a lens 54, which directs the illumination light beam 16 to an off-center partial region of the entrance pupil of the objective 36.

In the following, it will be explained how the detection light 32 is split spectrally in the detection unit 50 of the SCAPE microscope 10 according to FIGS. 1 to 6 in order to generate from the line image 42 multiple line images of different spectral composition corresponding to the line image 42. For the purpose of spectral splitting, the detection unit 50 has a hyperspectral detector module 56 which is shown in FIG. 7 in one exemplary embodiment.

Figure 7:
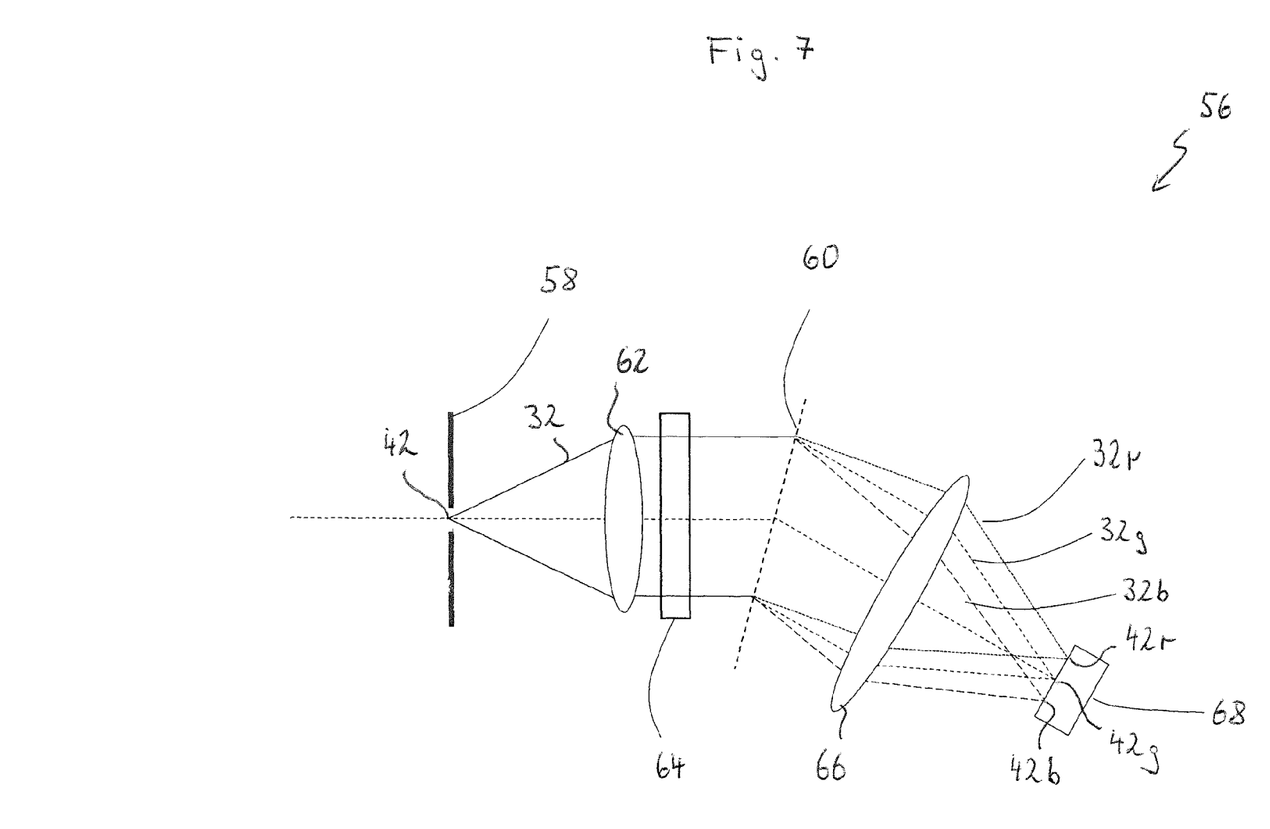
FIG. 7 shows a hyperspectral detector module according to the invention that is part of the detection unit of the SCAPE microscope according to FIGS. 1 to 6, wherein this embodiment has an area detector.

The detector module 56 of FIG. 7 includes a slit diaphragm 58 located at the location of the line image 42. In the illustration according to FIG. 7, the direction of the longitudinal extent of the line image 42 is perpendicular to the drawing plane. The slit diaphragm 58 accordingly acts as a field diaphragm, which defines a sharp boundary for the optical imaging of the line image 42 within the hyperspectral detector module 56.

The detector module 56 includes a dispersive element 60, shown purely schematically in FIG. 7 by a dashed line. The dispersive element 60 is, for example, a diffraction grating, a prism or, in a particularly preferred embodiment, a spatial light modulator. To image the line image 42 onto the dispersive element 60, the detector module 56 further includes a lens 62 disposed downstream of the slit diaphragm 58 in the detector beam path. Located between the lens 62 and the dispersive element 60 is a bandpass filter 64, which is designed to block light in the wavelength range of the illumination light beam 16. Thus, the bandpass filter 64 prevents the excitation light represented by the illumination light beam 16 and reflected on the specimen 30, from being detected in the detector module 56.

The dispersive element 60 spectrally splits the detection light 32 that has passed through the bandpass filter 64. The splitting direction of the dispersive element 60 lies perpendicular to the longitudinal extent of the line image 42, i.e. in the drawing plane in FIG. 7. In the embodiment shown in FIG. 7, it is assumed purely by way of example that the dispersive element 60 splits the detection light 32 into a red spectral component 32r, a green spectral component 32g, and a blue spectral component 32b. Spectral components 32r, 32g, and 32b are directed onto an area detector 68 via a further lens 66.

Thus, in the embodiment of FIG. 7, three line images of different spectral composition are generated from line image 42 on the area detector 68, namely a red line image 42r, a green line image 42g, and a blue line image 42b. The line images 42r, 42g and 42b are offset in parallel to each other on the area detector 68 in the splitting direction of the dispersive element 60.

As mentioned above, the formation of the dispersive element 60 in the form of a spatial light modulator represents a very preferred embodiment. Namely, in this embodiment it is possible to flexibly adjust the split caused by the dispersive member 60 as needed. If, for example, a particularly good spectral resolution is desired, the dispersive element 60 is adjusted in such a way that it fans out the detection light 32 as far as possible while using the entire sensor 68. If, on the other hand, a particularly high read-out speed of the area detector 68 is desired, the fanning out caused by the dispersive element 60 and, thus, the region to be read out on the area detector 68 can be reduced accordingly. In this way, it is also possible to improve the signal-to-noise ratio of the area detector 68.

Figure 8:
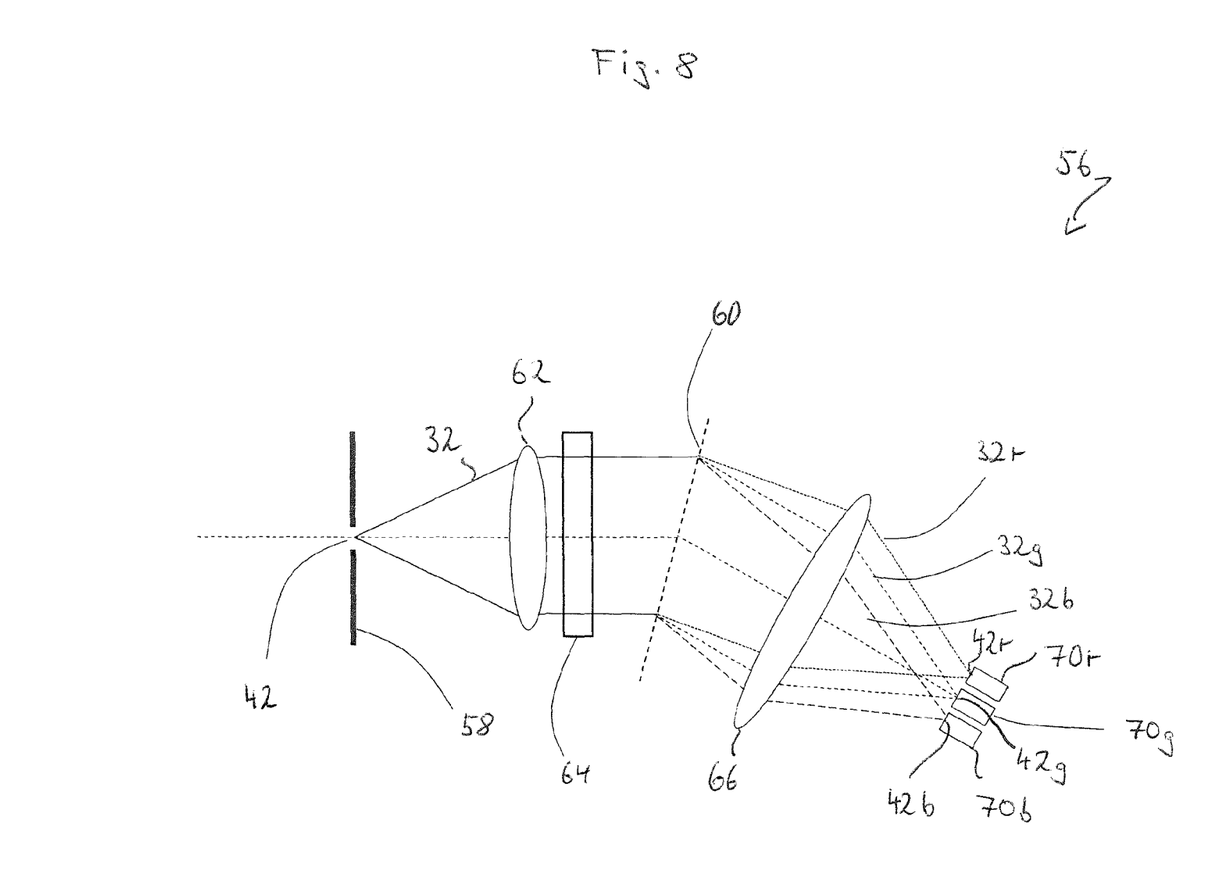
FIG. 8 shows another exemplary embodiment of the hyperspectral detector module with multiple detectors.

FIG. 8 shows a modification of the detector module 56 in which three line detectors 70r, 70g and 70b on which the red line image 42r, the green line image 42g and the blue line image 42b are generated are provided instead of the area sensor 68 according to FIG. 7. In the embodiment shown, the line detectors 70r, 70g and 70b are arranged in such a way that their light-sensitive sensor areas are in a common plane. In this respect, the arrangement according to FIG. 8 in which the line images 42r, 42g and 42b are produced in a common plane corresponds to the embodiment shown in FIG. 7. In contrast to this, however, there is the advantage of a higher flexibility if the line detectors 70r, 70g and 70b are displaceable with respect each other in the splitting direction of the dispersive element 60. If, for instance, a particularly high spectral resolution is desired, then the line detectors 70r, 70g and 70b are arranged spaced apart from each other at a correspondingly large distance. If, by contrast, a particularly strong sensor signal should be achieved with the individual line detectors 70r, 70g and 70g, then the spreading of the detection light 32 caused by the dispersive element 60 and, thus, a correspondingly smaller spacing of the line detectors 70r, 70g and 70b in the splitting direction is chosen.

Figure 9:
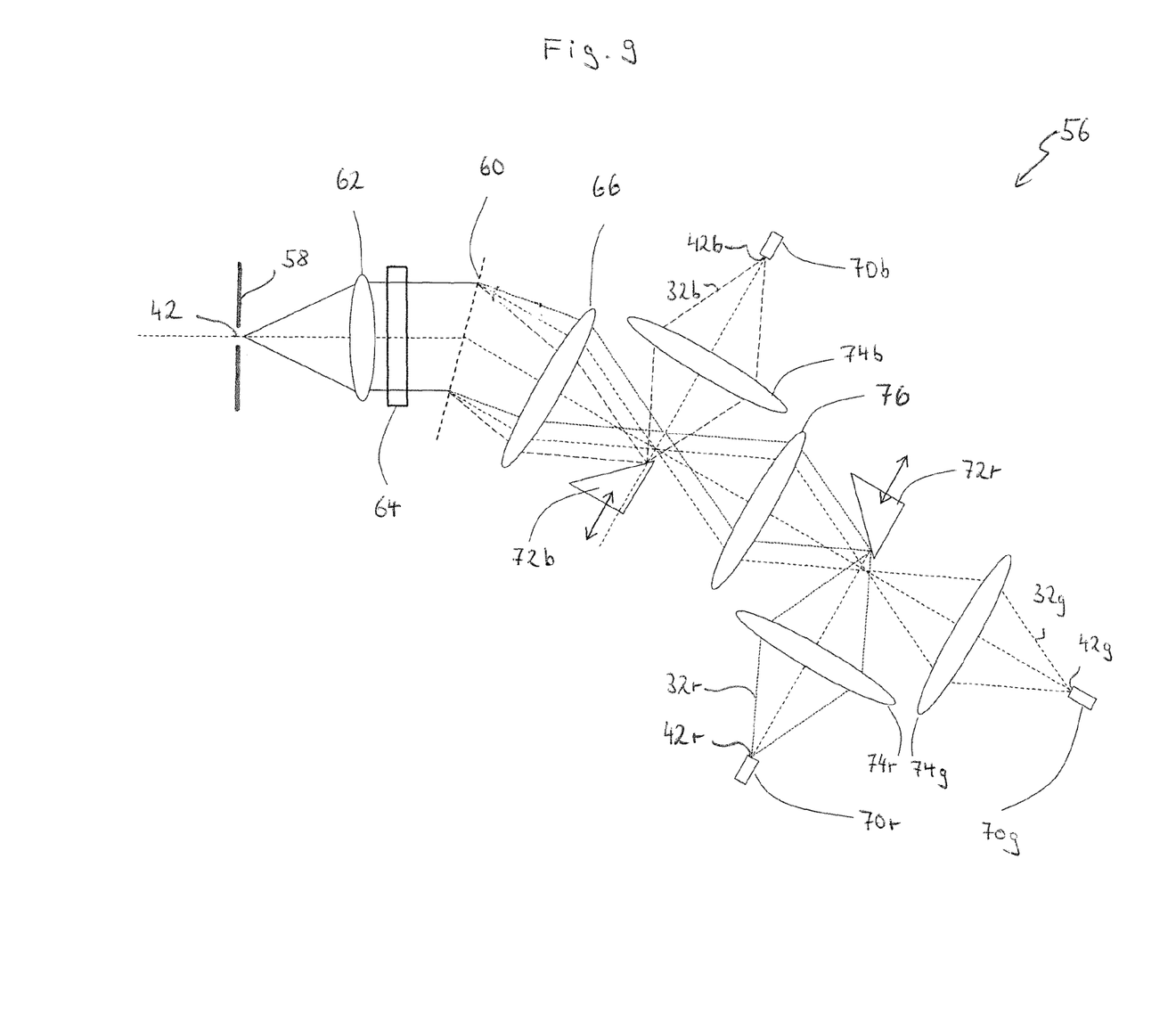
FIG. 9 shows another exemplary embodiment of the hyperspectral detector module with multiple detectors.

An embodiment of the detector module 56 which enables an even more flexible spectral splitting of the detection light 32 and thus an even more flexible generation of the different line images 42r, 42g and 42b is shown in FIG. 9. In the embodiment according to FIG. 9, the line detectors 70r, 70g and 70b can be distributed in almost any desired manner in space. To make this possible, the detector module 56 has a light deflecting element 72b associated with the line detector 70b and a light deflecting element 72r associated with the line detector 70r. The light deflecting elements 73b and 72r are each embodied in the form of a mirror, for example. Each of the light-deflecting elements 72r and 72b is displaceable in a direction that corresponds to the splitting direction of the dispersive element 60, as indicated in FIG. 9 by the double arrows.

In the arrangement according to FIG. 9, the red spectral component 32r generated by the dispersive element 60 hits the light deflecting element 72r after passing through the lens 66 and a further lens 76. As a result, the red spectral component 32r is reflected onto an anamorphic optical system 74r, which is designed, for example, as a cylindrical lens. The anamorphic optical system 74r is arranged upstream of the line detector 70r and has magnification equal to 1 in the direction of the longitudinal extent of the line detector 70r. The anamorphic optical system 74r thus acts neutral in this direction. On the other hand, it has a reducing effect in a direction that corresponds to the splitting direction of the dispersive element 60. This ensures that, even if the spatial extent of the spectral component 32r picked up by the light deflecting element 72r via reflection is relatively large, the spectral component 32r is detected in its entirety by the line detector 70r, even if the line detector 70r is relative narrow in the splitting direction. By moving the light deflecting element 72r in the splitting direction of the dispersive element 60, the spectral width of the spectral component of 32r can be adjusted as desired.

The arrangement, which is based on the blue spectral component 32b and is formed from the line detector 70b and the displaceable light deflecting element 72b, operates in a corresponding manner. According to this arrangement, the blue spectral component 32b split by the dispersive element 60, after passing through the lens 66 at the light deflecting element 72b, is reflected toward an anamorphic optical system 74b, which in turn is formed as a cylinder lens and is arranged upstream of the line detector 70b. The anamorphic optical system 74b operates in relation to the blue spectral component 32b in the same manner as the anamorphic optical system 74r in relation to the red spectral component 32r. Accordingly, the anamorphic optical system 74b ensures that all of the spectral information of the blue spectral component 32b picked up from the detection light 32 by the displaceable light deflecting element 72b is compressed onto the line detector 70b.

The green spectral component 32g, after passing through the lens 66, passes through the light deflecting element 72b and, after passing through the lens 76, also passes through the light deflecting element 72r. Then the green spectral component 32g, in a manner similar to the above explanation for the other two spectral components 32r and 32b, is bundled by an anamorphic optical system 32g on the line detector 42g. The anamorphic optical system 32g also ensures here that all of the spectral information contained in the green spectral component 32g is detected by the line detector 42g.

In the arrangement according to FIG. 9, the two light deflecting elements 72b and 72r ensure that the spectral components of the two opposing edge regions of the fanned out light bundle split by the dispersive element 60 are coupled out from the detection light 32. This means that first the blue spectral component 32b propagating in FIG. 9 in the lower edge region of the fanned-out light beam is coupled out by the light deflecting element 72r in the direction of the line detector 70b, and then the red spectral component 32r propagating in the upper edge region of the light bundle is coupled out by the light deflecting element 72r in the direction of the line detector 70r before the green spectral component 32g lying between these two spectral components first hits the line detector 70g undeflected.

Figure 10:
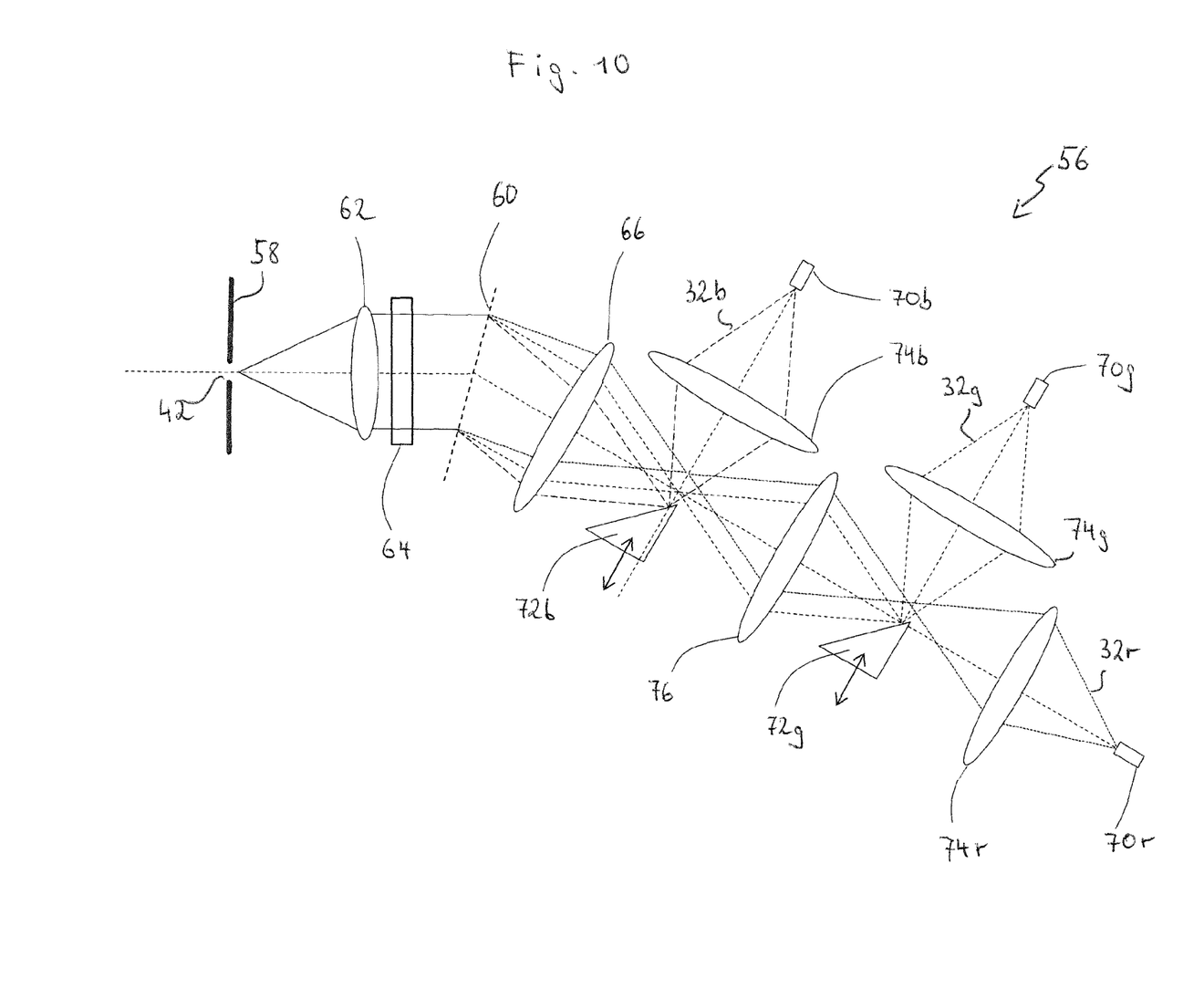
FIG. 10 shows another exemplary embodiment of the hyperspectral detector module with multiple detectors.

On the other hand, FIG. 10 shows an arrangement in which the spectral components are successively coupled out of the detection light 32 from the lower edge area in FIG. 9. In this way, the blue spectral component 32b is first directed by the light deflecting element 72b through the anamorphic optical system 74b onto the line detector 70b. Then the green spectral component 32g hits a light deflection element 72g and directs it through an anamorphic optical unit 74g onto the line detector 70g. Finally, the red spectral component 32r hits the line detector 70r undeflected after passing through the lenses 66, 76 and the anamorphic optical system 74r.

In FIGS. 7 to 10, the excitation light reflected in the specimen 30 is respectively filtered out of the detection light 32 by the bandpass filter 64. However, such a bandpass filter is relatively expensive. It is also not flexibly usable for different excitation wavelengths, i.e. it must be changed out if the excitation wavelength is varied. Finally, such a bandpass filter has a certain minimum bandwidth, which can lead to light losses in the detected fluorescence radiation.

Figure 11:
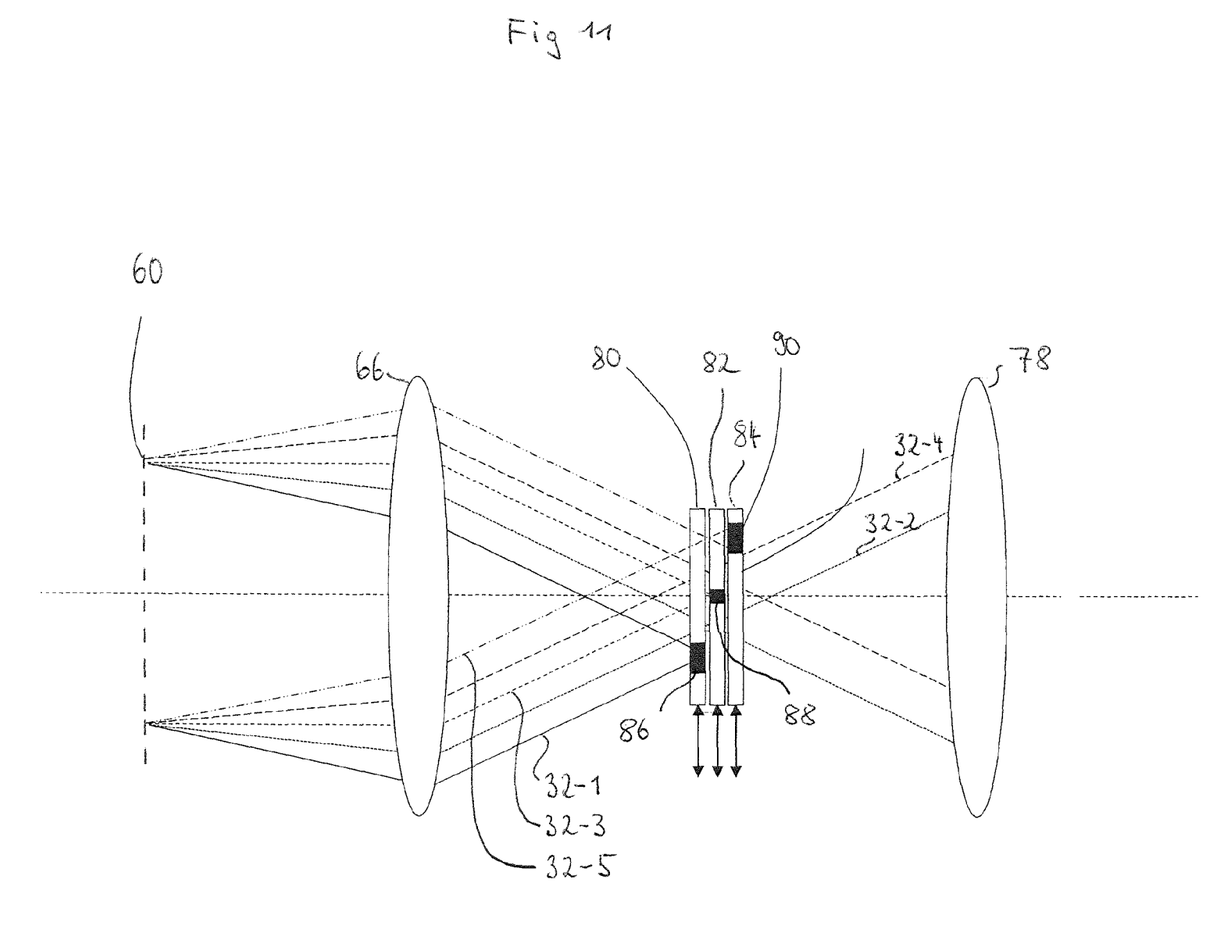
FIG. 11 shows another exemplary embodiment of the hyperspectral detector module in which multiple light blocking elements displaceable with respect to each other are provided instead of a bandpass filter.

An arrangement which does without a bandpass filter and therefore avoids the above-mentioned problems is shown in FIG. 11. Instead of a band-pass filter, multiple light blocking elements 80, 82 and 84 are used there that are disposed downstream of the dispersive element 60. The light blocking elements 80, 82 and 84 are each configured in the form of a transparent substrate having a region 86, 88 and 90, respectively, that absorbs or reflects the excitation light. As indicated in FIG. 11 by the double arrows, the light blocking elements 80, 82 and 84 are displaceable relative to each other in the splitting direction of the dispersive element 60. As a result, the light-absorbing or reflective regions 86, 88 and 90 can be positioned in any desired manner within the fanned-out detection light 32 in order to filter out those spectral components which represent the excitation light reflected at the specimen 30. In the example of FIG. 11, these are the spectral components labeled 32-1, 32-3 and 32-5. On the other hand, the spectral components transmitted by the light blocking elements 80, 82 and 84 are designated in FIG. 11 with 32-2 and 32-4. After passing through a further lens 78 in the previously described manner, they are supplied to one or more detectors.

Figure 12:
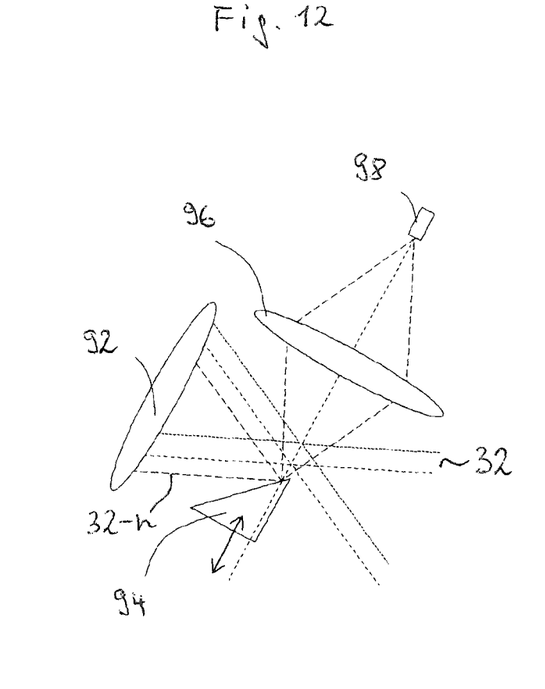
FIG. 12 shows one of multiple functional units for constructing the hyperspectral detector module, wherein this functional unit has an anamorphic optical system and a line or area detector.

In the embodiments shown in FIGS. 7 to 10, one area detector and three line detectors are used, respectively. However, it goes without saying that the detector module 56 can also have a different, in particular higher, number of detectors. In the illustration according to FIG. 12, a functional unit is taken from the arrangements shown in FIGS. 9 and 10 and can be connected several times in succession to construct a detector module which has any desired number of detectors. The functional unit according to FIG. 12 comprises a lens 92 through which pass various spectral components of the detection light 32 (not yet coupled out by a preceding functional unit). One of these spectral components, designated with 32-n in FIG. 12, hits a light deflecting element 94 that is displaceable in the splitting direction of the dispersive element 60. The spectral component 32-n is coupled out of the detection light 32 in the direction of an anamorphic optical system 96 by reflection against the light deflection element 94. The anamorphic optical system 96 then compresses the spectral component 32-n in the manner described above onto a detector 98, which can be designed as a line detector or area detector.

Figure 13:
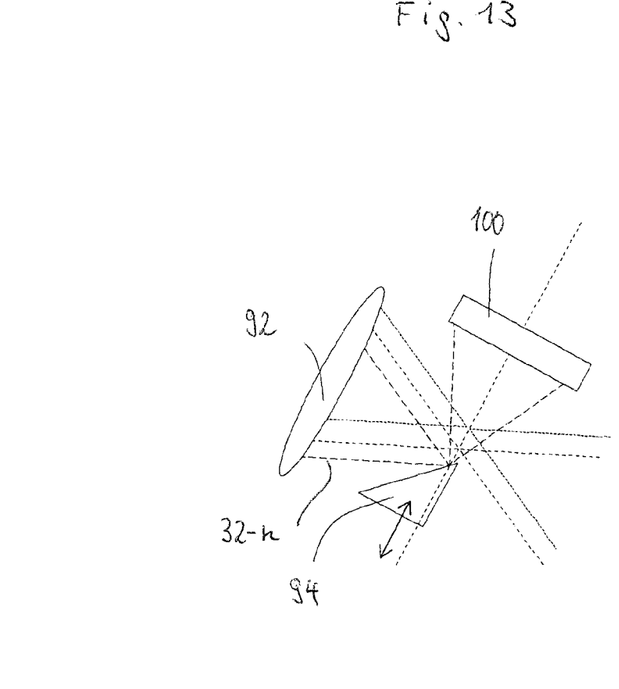
FIG. 13 shows one of multiple functional units for constructing the hyperspectral detector module, wherein said functional unit has a light trap.

A further functional unit which can be used for sequentially constructing a detector module is shown in FIG. 13. Instead of the anamorphic optical system 96 and the detector 98, this functional unit contains a light trap designated as 100, which absorbs the spectral component 32-n coupled out by the light deflection element 94. The functional unit of FIG. 13 can typically be used between two units of the kind shown in FIG. 12 to screen out wavelength ranges that are not of interest. In particular it is also possible with the functional unit shown in FIG. 13 to filter out the excitation light contained in the detection light and reflected against the specimen 30.

Figure 14:
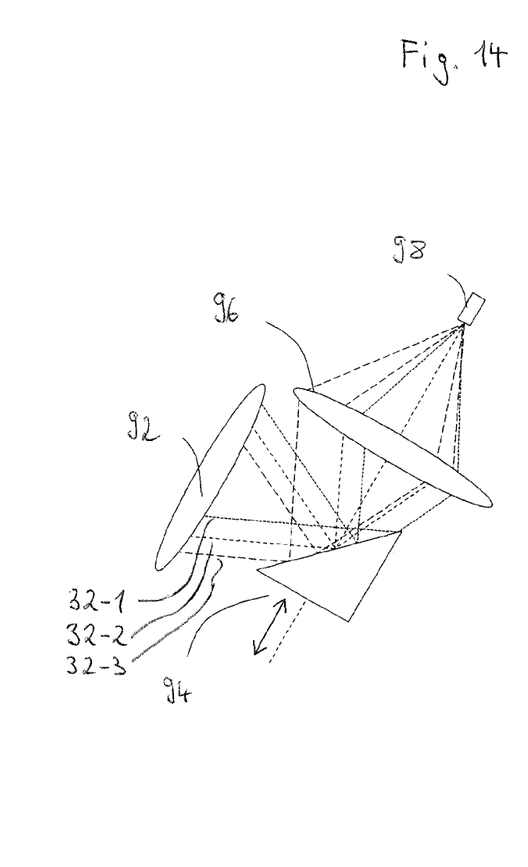
FIG. 14 shows the functional unit according to FIG. 12 in a view that illustrates the operation of the anamorphic optical system.
Figure 15:
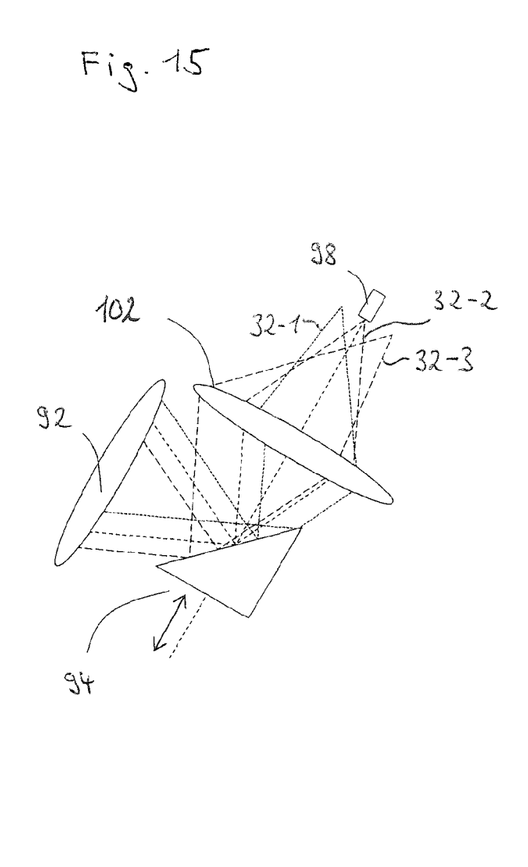
FIG. 15 shows a functional unit without anamorphic optical system as a comparative example.

The operation of the anamorphic optical system 96, which is part of the functional unit shown in FIG. 12, is again illustrated in FIGS. 14 and 15. As FIG. 14 shows, the anamorphic optical system 96 ensures that all spectral components designated with 32-1, 32-2 and 32-3, which in their entirety take up a relatively large space on the light deflecting element 94 in the splitting direction of the dispersive element 60, are compressed onto the detector. By contrast, FIG. 15 shows a comparative example in which a conventional lens 102 is used instead of an anamorphic optical system 96. In the example of FIG. 15, the lens 102 is incapable of directing the spectral components 32-1 and 32-3 onto the detector 98.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A light microscope, comprising:
a scan illumination unit, which is designed to illuminate a specimen volume with a line focus produced by an illumination light beam to propagate through the specimen and moved transversely to a light propagation direction; and
a descanned detection unit, which is designed to produce a stationary first line image of points in the specimen lying along the light propagation direction from detection light that originates from a target region within the specimen illuminated with the moving line focus,
wherein the scan illumination unit and the descanned detection unit have a common objective, which is designed to receive both the illumination light beam and the detection light, and
wherein the descanned detection unit contains a dispersive element, which is designed to spectrally split the detection light in a direction orthogonal to the first line image in order to generate multiple second line images, corresponding to the first line image, that contain different spectral information from each other.

2. The light microscope according to claim 1, wherein a splitting direction of the dispersive element is perpendicular to a longitudinal extension of the first line image.

3. The light microscope according to claim 1, wherein the descanned detection unit contains an optical element, which is designed to direct the detection light of the first line image to the dispersive element.

4. The light microscope according to claim 3, wherein the descanned detection unit comprises a slit diaphragm arranged at a location of the first line image.

5. The light microscope according to claim 1, wherein the descanned detection unit for detecting the second line images contains at least one sensor designed as an area detector on which the second line images are generated parallel to one another.

6. The light microscope according to claim 5, wherein the descanned detection unit includes at least one anamorphic optical system, which is arranged upstream of the at least one sensor and has an optical effect adapted in a splitting direction of the dispersive element to an extension of the sensor in the splitting direction.

7. The light microscope according to claim 5, wherein the at least one sensor is displaceable in a direction that corresponds to a splitting direction of the dispersive element.

8. The light microscope according to claim 5, wherein the descanned detection unit includes at least one light deflecting element, which is designed to deflect a portion of the detection light split by the dispersive element toward the at least one sensor.

9. The light microscope according to claim 8, wherein the at least one light deflecting element comprises multiple light-deflecting elements that successively deflect split detection light from at least one side to the at least one sensor.

10. The light microscope according to claim 8, wherein the at least one light deflecting element is displaceable in a direction that corresponds to the splitting direction of the dispersive element.

11. The light microscope according to claim 1, wherein the descanned detection unit for detecting the second line images contains multiple sensors respectively designed as line detectors on which one of the second line images is produced in each case.

12. The light microscope according to claim 11, wherein the line detectors are arranged in a plane parallel to each other.

13. The light microscope according to claim 1, wherein the descanned detection unit includes at least one light blocking element, which is designed to block spectral components of the detection light that are within a wavelength range of the illumination light beam.

14. The light microscope according to claim 13, wherein the at least one light blocking element is arranged downstream of the dispersive element.

15. The light microscope according to claim 14, wherein the scan illumination unit and the descanned detection unit have a common light deflection element, which is rotatable about at least one axis for scanning the illumination light beam and for descanning the detection light.

16. The light microscope according to claim 15, wherein the common light deflecting element is rotatable about two axes lying perpendicular to one another.

17. The light microscope according to claim 14, wherein the at least one light blocking element is displaceable in a splitting direction of the dispersive element.

18. The light microscope according to claim 1, wherein the first line image does not include an image of points that are outside of the points in the specimen lying along the light propagation direction.

19. The light microscope according to claim 1, wherein the dispersive element is designed to produce at least three of the second line images that correspond to the first line image and contain different spectral information from each other.

20. A method for light-microscopic imaging of a specimen, the method comprising:
illuminating a volume of the specimen by a scan illumination unit with a line focus produced by an illumination light beam to propagate through the specimen and moved transversely or perpendicular to a light propagation direction;
producing, by a descanned detection unit, a stationary first line image of points in the specimen lying along the light propagation direction from detection light that originates from a target region within the specimen illuminated with the moving line focus;
receiving, by a common objective used for the scan illumination unit and the descanned detection unit, the illumination light beam and the detection light; and
spectrally splitting, by a dispersive element contained within the descanned detection unit, the detection light in a direction orthogonal to the first line image so as to produce multiple second line images, corresponding to the first line image, that contain different spectral information from each other.

* * * * *